Patented Mar. 19, 1940

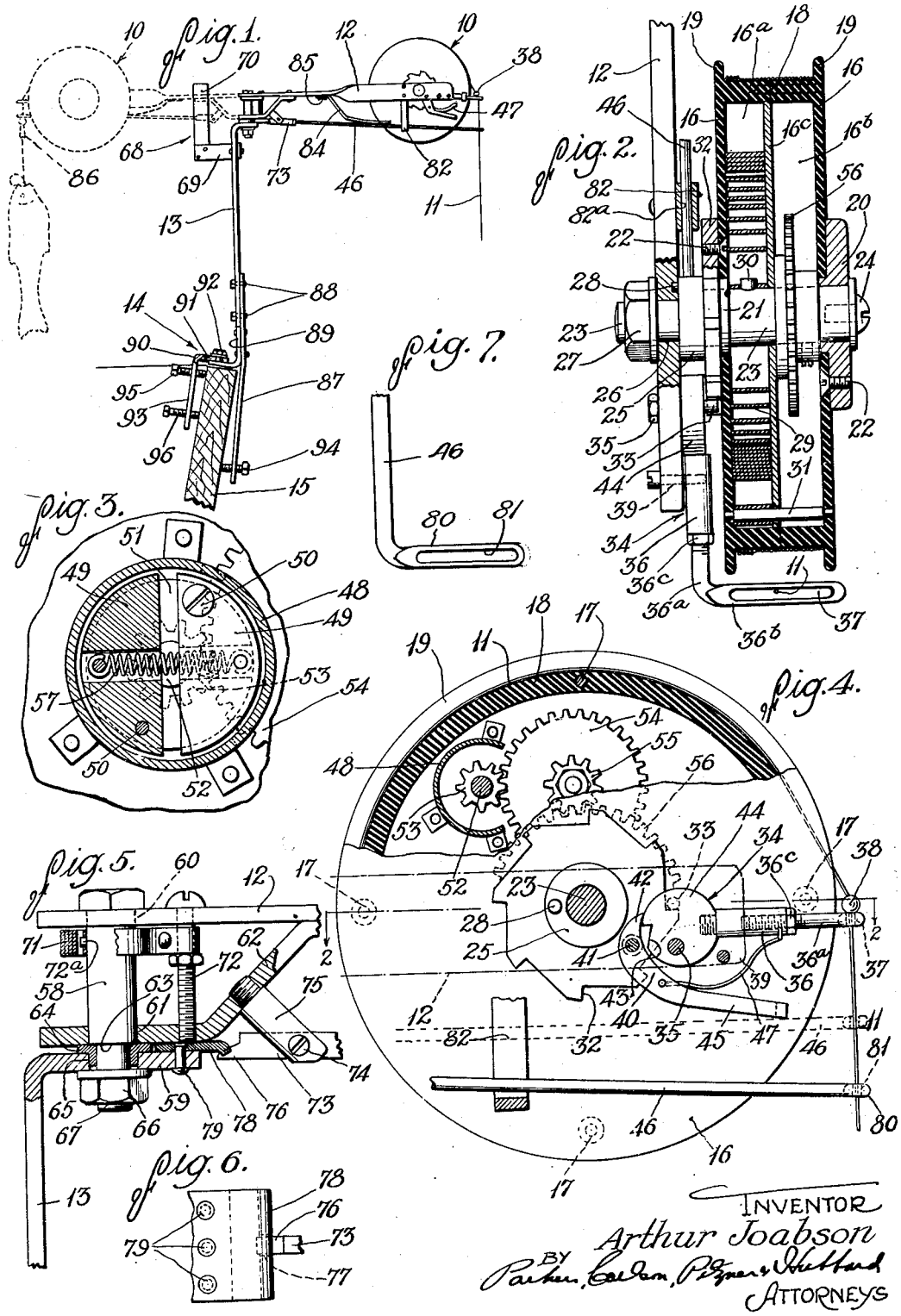

2,194,088

UNITED STATES PATENT OFFICE 2,194,088

FISHING DEVICE

Arthur Joabson, Chicago, Ill.

Application April 5, 1937, Serial No. 134,934

8 Claims. (Cl. 43—15)

The invention relates to fishing devices and more particularly to an improved apparatus for automatically catching fish.

A general object of the invention is to provide a device for catching fish, whereby the process of hooking, reeling in and landing a fish is automatically accomplished more efficiently than has been possible heretofore.

Another object of the invention is to provide a simple and inexpensive automatic fish-catching device for attachment to a boat, pier or similar structure, which in operation requires only that the fisherman bait the hook and set the line at a desired depth, the apparatus embodying means for automatically hooking, playing, reeling in and landing a fish taking the bait.

Another object is to provide in a device of this nature, an automatic reel of new and improved construction which includes means for storing energy as the line is paid out in setting the device for operation, for subsequent use in hooking a fish and reeling it in, together with means in control of the stored energy for maintaining the line in set condition until tripped by the action of the fish in taking the bait.

In conjunction with the foregoing, another object resides in the provision of a novel swingable support for the reel which may be positioned to permit setting of the line and which has means associated therewith, releasable when a fish has been drawn out of the water, for swinging the support to "land" the fish.

Another object is to provide a novel governor means for preventing excessive speed of movement of the reel and line.

Other objects and advantages will become apparent in the following description and from the accompanying drawing, in which:

Figure 1 is a view in elevation of an automatic fishing device embodying the features of the invention and showing, in full outline, the device in a "set" position and, in dotted outline, swung to its "landing" position.

Fig. 2 is a fragmentary sectional view substantially along line 2—2 of Fig. 4.

Fig. 3 is a fragmentary sectional view of a device for preventing excessive reel speed.

Fig. 4 is an enlarged fragmentary view of the device in a "set" position with part of the reel broken away to show the underlying construction.

Fig. 5 is an enlarged fragmentary side elevation partially in section showing a part of the reel supporting means.

Fig. 6 is a fragmentary plan view showing a detail of the trip mechanism used in conjunction with the automatic "landing" device.

Fig. 7 is another detail fragmentary plan view of said trip mechanism.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to Fig. 1 of the drawing, the assembly constituting an exemplary embodiment of the invention includes generally a reel of more or less conventional type (indicated at 10), upon which a fishing line 11 may be wound, an elongated support 12 adjacent an end of which the reel is rotatably mounted, and a vertical support 13 upon which the elongated support may be pivotally mounted for swinging movement in a horizontal plane, whereby the reel may be disposed either (as indicated in full outline) over the water, or (as indicated in dotted outline) over a boat, pier or other suitable landing point. Adjustable clamping means, generally indicated at 14, may be provided for fastening the vertical support to a gunwale 15 of a boat or the like.

Referring to Figs. 2 and 4 the reel shown therein comprises complementary disk-like members 16 having annular flanges adapted to be brought into juxtaposition and be secured together by screws 17 to form a drum 18. The peripheral edges of the members extend beyond the flanges as at 19 to confine the fishing line 11 wound on the drum. The interior of the reel is separated into a spring compartment 16a and a governor compartment 16b by a flat circular partition 16c disposed radially of the axis of the drum. For rotatably mounting the reel on the support, bearing members 20 and 21 are secured to the disks 16 as by screws 22, and are axially apertured rotatably to receive a shaft 23 which extends through a bore 26 in the support 12 and is firmly secured thereto by a nut 27. Axial movement of the reel on the shaft is limited in one direction (to the right in Fig. 2) by a screw and washer 24 secured to the free end of the shaft. Similar movement in the opposite direction is prevented by a collar 25 integral with the shaft. A pin 28, extending from the collar 25 into a cooperating bore in the support, provides means for holding the shaft against rotation relative to the support.

Means is provided for storing energy as the reel is rotated in a direction to pay out the line. Herein this means comprises a spiral spring 29 confined within the spring compartment 16ᵃ and secured to the shaft at one end, as at 30, and to the drum at its other end, as by a pin 31. The spring is arranged so that rotation of the reel in a clockwise direction (see Fig. 4) to pay out the line will place the spring under tension. Reverse or winding-in action of the reel, under the influence of the spring after the line is paid out a desired distance, is temporarily restrained by readily releasable mechanism which is capable of being tripped by the pull of a hooked fish on the line. In the instant embodiment a ratchet and pawl mechanism is employed for this purpose and ratchet teeth 32 may be formed on the rim of the bearing member 21 for coaction with a pawl 33 arranged releasably to engage the ratchet teeth to prevent movement of the reel by spring action.

For the purpose of releasing the reel to the rewinding force of the spring after the device has been set for operation, the pawl is mounted on a lever 34 arranged to be actuated by a pull or jerk on the line to displace the pawl from the ratchet. The lever in this instance includes a disk 44, which is eccentrically pivoted on the support as at 35, and carries the pawl 33 at a distance from the pivotal point. A tubular arm 36 screw threaded into said disk extends radially therefrom toward the adjacent periphery of the reel, and an extension 36ᵃ screw threaded into the arm is adjustably secured thereto by a lock nut 36ᶜ. An angular portion 36ᵇ of the extension 36ᵃ extends parallel to the surface of the drum outwardly thereof and is arranged to entrain the line by such means as a slot 37 therein through which the line is threaded.

A slidable obstruction 38 on the line is shiftable along the line to a position resting on or adjacent to the angular portion 36ᵇ of the lever. A small rubber ball having a sufficient frictional grip on the line to maintain its relative position when the line is pulled has been found suitable. When the device is "set" in operative condition for catching fish the lever 34 is in a raised position (as indicated in Fig. 4), the pawl and ratchet being held in engagement by the force exerted by the tensioned spring. Now if the line is pulled, as by a hooked fish, the rubber ball will move the lever downwardly to free the pawl from the ratchet and release the reel to the rewinding action of the spring.

The relationship of the pawl 33, the lever 34 and the pivotal point 35 of the lever, as shown in Fig. 4, provides a trip mechanism which will remain in its set position yet is quite sensitive to a pull on the line.

After release the lever 34 will normally rest, by its own weight, against a stop 39 extending from the support. As the line is drawn in through the slot 37 during a rewind operation the lever might be carried upwardly to reengage the pawl with the ratchet. This would relieve the tension on the line and possibly result in a loss of the fish. To avoid this difficulty, means is provided for latching the pawl against accidental reengagement. Thus a lever 40 is pivoted on a stud 41 on the support and has a wedge shaped end 42 arranged to engage a notch 43 in the disk when the pawl is in its released position. When the device is "set" the wedge shaped end 42 is held against the periphery of the disk, as illustrated in Fig. 4, by the weight of an arm 45 located on the same side of the pivot as the end 42 and extending downwardly and outwardly of the support. As the disk is rotated in a clockwise direction to displace the pawl from the ratchet the end of the lever will drop into engagement with the notch 43 and prevent the line from dragging the lever 34 upwardly. The arm 45 has another function to be presently described.

In order to prevent excessive speed of rotation of the reel, a governing device is provided and this device may be suitably confined within the governor compartment 16ᵇ. Referring to Figs. 3 and 4, a cylindrical brake drum 48 is secured to one of the disks 16 of the reel housing. A pair of brake shoes 49 of generally semi-circular shape are dimensioned to be placed in the drum in diametrical opposition and together form a divided disk, the peripheral surface of which is adjacent to the inner surface of the brake drum. Each shoe is separately and eccentrically pivoted, as at 50, to a plate 51 which is fixed on a shaft 52 rotatably mounted on the reel housing. A speed multiplying gear train in the governor compartment drives the shaft 52 from the shaft 23 as relative motion between the reel and the shaft 23 occurs, the gears being designated by the numerals 53, 54, 55 and 56. A tension spring 57 connected to both shoes normally holds them disengaged from the drum. When the shoes are rotated they are urged apart by centrifugal force and at or above a predetermined critical speed will drag on the drum. Excessive speed of the reel is thereby prevented.

Another feature of the invention resides in the provision of an automatic means for swinging a hooked and reeled in fish to a "landed" position entirely without attention from the fisherman. One preferred organization for accomplishing this purpose includes means for supporting the reel for swinging movement in a horizontal plane between a "set" position, in which the reel is extended over the water and an opposite position or "landing" position, in which the reel is located above the boat or pier. Associated with the reel supporting means is latching means for maintaining the apparatus in "set" position. The latching means is automatically disengageable as the hooked fish reaches a completely reeled in position to allow a spring or the like associated with the support to swing the reel and fish to the "landing" position.

A preferred form of structure for performing the aforesaid operations is best seen in Figs. 1, 5 and 6. The reel support is provided at the end remote from the reel with an offset bracket member 62 (Fig. 5) rigidly secured to the support and having a part extending in spaced parallel relation to the end of the support. Axially alined apertures 60 and 61, formed in the support and offset bracket member respectively, receive a vertical pivot pin 58 rigidly secured to a horizontally bent leg 59 at the upper end of the vertical support 13. The pivot pin has a shoulder 63 adapted to rest upon a short flanged sleeve 64 secured within a bore 65 in the leg 59. The flanged sleeve has a smooth upper face providing a bearing upon which the offset bracket 62 rides. A nut 66, secured on a threaded portion 67 of the pin, rigidly holds the assembly in place and provides means whereby the device may be easily dismantled at this point. A yieldable stop 68 (Fig. 1), comprising a bracket 69 secured to the vertical support and a vertical resilient strip 70, extending into the plane of rotation of the reel support, limits the swinging movement of the support and defines the landing position thereof.

In the embodiment illustrated the means for swinging the support comprises a spiral spring 71 coiled around the pivot pin and secured at one end to the reel support by a pin 72 and at its other end, as 72ª, to the pivot pin. The spring is arranged normally to urge the support toward the yieldable stop 68. Swinging movement of the support toward its "set" position will place the spring under additional tension to be expended in swinging the support to land the fish.

Releasable detent means for holding the support in a "set" position away from its normal landing position includes a latching lever 73, pivoted, as at 74, on an extension 75 rigid with the bracket 62. The lever has a nose 76 adapted to cooperate with a notch 77 formed in a plate member 78 secured by rivets 79 or the like to the leg 59 of the vertical support. The lever 73 carries an elongated rod 46 (Figs. 1, 4 and 7) which extends along and beneath the support 12 to a position adjacent to the depending line where it terminates in an angularly bent end 80 substantially identical to the angular portion 36ᵇ (Fig. 2) and located directly below said portion. The end 80 is similarly slotted as at 81 (Fig. 7) to entrain the line. A guide 82 secured to the reel support and having a vertical slot 82ª therein (Fig. 2) through which the rod 46 extends, limits the movement of the lever 73 and rod 46 to a substantially vertical plane. A flat spring member 84 secured to the reel support at 85 engages the rod 46 to urge the lever arm downwardly and releasably maintaining the engagement of the latch with the notch.

In the act of setting the apparatus for operation the lever assembly and the support are grasped by the fisherman. This moves the lever assembly toward the support and the support is free to be swung to set position. At the same time the pawl and ratchet mechanism is conditioned to allow the line to be paid out but to prevent rewinding thereof. Thus the parts are so arranged that the rod 46 in its upward movement engages and moves the arm 45 (as indicated in dotted outline in Fig. 4) to release the wedge shaped end 42 of the lever 40 from the notch in the disk 44. A spring 47 (see Figs. 1 and 4) fixed to the arm 45 loosely engages at its free end a part of the pawl assembly 34 and urges the pawl yieldably into engagement with the ratchet teeth. The reel is now in condition for manually paying out the line. When the line has been paid out to a sufficient extent the stop 38 is shifted to a position adjacent to the angular portion 36ᵇ of the pawl lever. The reel support may then be rotated to a position extending over the water. If the lever arm 46 is now released the detent means will engage to maintain the support in "set" position as illustrated in Fig. 4.

When a fish has been hooked, the pull on the line releases the pawl from the ratchet, and the energy stored in the spring is automatically released to rotate the reel in a direction to wind up the line. Accidental reengagement of the pawl is prevented by engagement of the wedge end 42 of the lever 40 with the notch in the disk 44. The spring keeps a constant strain on the line automatically "playing" the fish until it is finally wound in. Excessive speed of movement of the reel and line during this time is prevented by the governor. When the fish bait or any other obstruction (indicated at 86) adjacent to the free end of the line strikes the lever arm 46, the detent means is released and the spring 71 automatically swings the reel support to its normal position against the stop 68, thus landing the fish. If the fish has not been properly hooked, the initial pull on the line releases the reel holding means and the loose line is reeled in and swung to a position convenient for inspection for rebaiting.

For adjusting the axis of the pivotal connection of the reel support with the vertical support in substantially a vertical position so that the reel support will swing freely, adjustable clamping means are provided whereby the vertical support may be fastened to boat gunwales or the like having various degrees of inclination and thickness. Thus, a forked clamp (indicated generally at 14) includes an extension 87 detachably secured to the vertical support by screws 88, so that it may be easily removed therefrom in dismantling the device. An angle bracket 89 is secured to the extension and projects at substantially right angles thereto. A second angle bracket 90 is longitudinally slotted (as indicated at 91) slidably to receive a clamping screw 92 which is threaded into the projecting portion of the first mentioned bracket. The bracket 90 has an elongated portion 93 disposed substantially parallel to the extension 87. A set screw 94 extends through a threaded bore in the extension 87 and set screws 95 and 96 extend through similar bores in the elongated portion 93 of the bracket 90 for locking the support to a boat gunwale or the like. By adjusting the set screws the support may be clamped in a substantially vertical position on boat gunwales of various inclinations and thicknesses.

From a consideration of the foregoing it will be apparent that the mechanism provided for hooking, reeling in, and landing fish is after it has once been set actuated automatically without attention on the part of the fisherman. The reeling in operation is effectively controlled whereby to keep a tension on the line and "play" the fish. The mechanism is simple and inexpensive in construction, reliable and effective in operation, and may be easily dismantled for storing and carrying purposes.

I claim as my invention:

1. In an automatic fishing apparatus of the character described, the combination of a support mounted for swinging movement between set and landing positions including means for swinging said support from the set to the landing position, a reel carried by said support including means for driving said reel to rewind the line thereon after the line has been set, and releasable means for holding said line in set condition, said means having a normally disengaged position from which it must be moved by a manipulative act to effect engagement, and a detent for holding said support in its set position including a part convenient to the grasp of the operator and movable thereby to effect engagement of said releasable means.

2. In a device for automatically reeling in and landing a hooked fish, the combination of a fishing line reel having associated therewith means for rewinding a line on said reel said means operable in response to a pull on the line, a support for said reel, means for pivotally mounting said support for swinging movement about a vertical axis between a set position in which a line may depend from said reel into the water and a retracted position conveniently accessible to the operator, spring means for urging said support toward said last mentioned position, and a detent for holding said support in said set position including an elongated arm extending into a position adjacent the line depending from said reel, and means engageable by an obstruction near the end of the line as the line is wound in for releasing said detent.

3. A fishing apparatus including in combination a support pivotally mounted for horizontal swinging movement selectively to either of two positions, a reel mounted thereon having means connected therewith for storing energy as an associated fishing line is paid out, releasable detent means for preventing reverse action of said reel, means adjustable on said line for connecting said detent means with the line to transmit a pull on said line to said detent means to release said reel, spring means for normally urging the support to one of its two positions, a trip mechanism for releasably holding the support in its other position against the force of said spring means, and means for releasing said trip mechanism when the line is substantially wound in whereby to release the support for swinging movement to its normal position.

4. A fishing device, having in combination, a support pivotally mounted for horizontal swinging movement selectively to either of two positions, a reel rotatably mounted on said support, a fishing line on said reel, spring means connected with said reel and adapted to be placed under tension as said line is paid out, trip mechanism for holding the reel against movement by said spring means and releasable by a pull on the line when a fish takes the bait, spring means connected with said support for urging it toward one of its positions and adapted to be placed under tension as said support is swung to its other position, a trip mechanism for holding the support in said other position and releasable when the line is substantially wound in to free the support for swinging movement, and means for detachably securing the device to a boat.

5. In a fishing apparatus, the combination of an elongated support mounted for horizontal swinging movement, a reel mounted thereon, a fishing line on said reel, yieldable limiting means extending into the plane of movement of said support, spring means for normally urging the support against said limiting means, detent means including a part entraining the fishing line for maintaining the support out of its normal position, means on said line engaging said part for releasing said detent means when the line is wound in to permit the support to swing to its normal position.

6. A fishing apparatus, having in combination a support, means for mounting said support for horizontal swinging movement, a reel rotatably mounted on the support, a fishing line on said reel, a yieldable stop extending into the plane of rotation of said support, spring means for urging the support against said stop, releasable latching means for maintaining the support in a position away from said stop, and means on said latching means engageable by an obstruction adjacent the end of the line to release said latching means and permit said support to swing to a position against said stop.

7. A fishing device, comprising in combination, a support mounted for swinging movement between a position in which the device is operatively set and a position in which the catch is landed, means for urging said support toward said last mentioned position, a reel rotatably mounted on said support and having means connected therewith for driving said reel in a line winding direction, normally disengaged means movable to an engaged position to hold said reel against movement in said winding direction, and detent means for holding said support in its set position against the force of the support urging means including a part convenient to the grasp of the operator in setting the support and movable to control the engagement of said detent, said part being engageable with said normally disengaged means to effect movement thereof into reel holding position as the device is manipulated to its set position.

8. An automatic fishing apparatus of the character described, comprising in combination, a support mounted for swinging movement between set and landing positions including resilient means for swinging said support toward said landing position, releasable latching means for holding said support in its set position, a reel carried by said support, a fishing line on said reel, means for driving said reel in a direction to wind the line thereon, a releasable detent for holding said reel against movement by the driving means, an actuating member for said detent extending to a position adjacent to the line when said line is set, a control member for said latching means extending to a position adjacent to the end of the line when the line is substantially rewound on said reel, means on said line for engagement with said actuating member to transmit a pull on said line to said detent means to release the reel, and means adjacent to the end of said line for engagement with said control member when the line is substantially rewound to release said latching means and permit the support to swing to its landing position.

ARTHUR JOABSON.